UNITED STATES PATENT OFFICE.

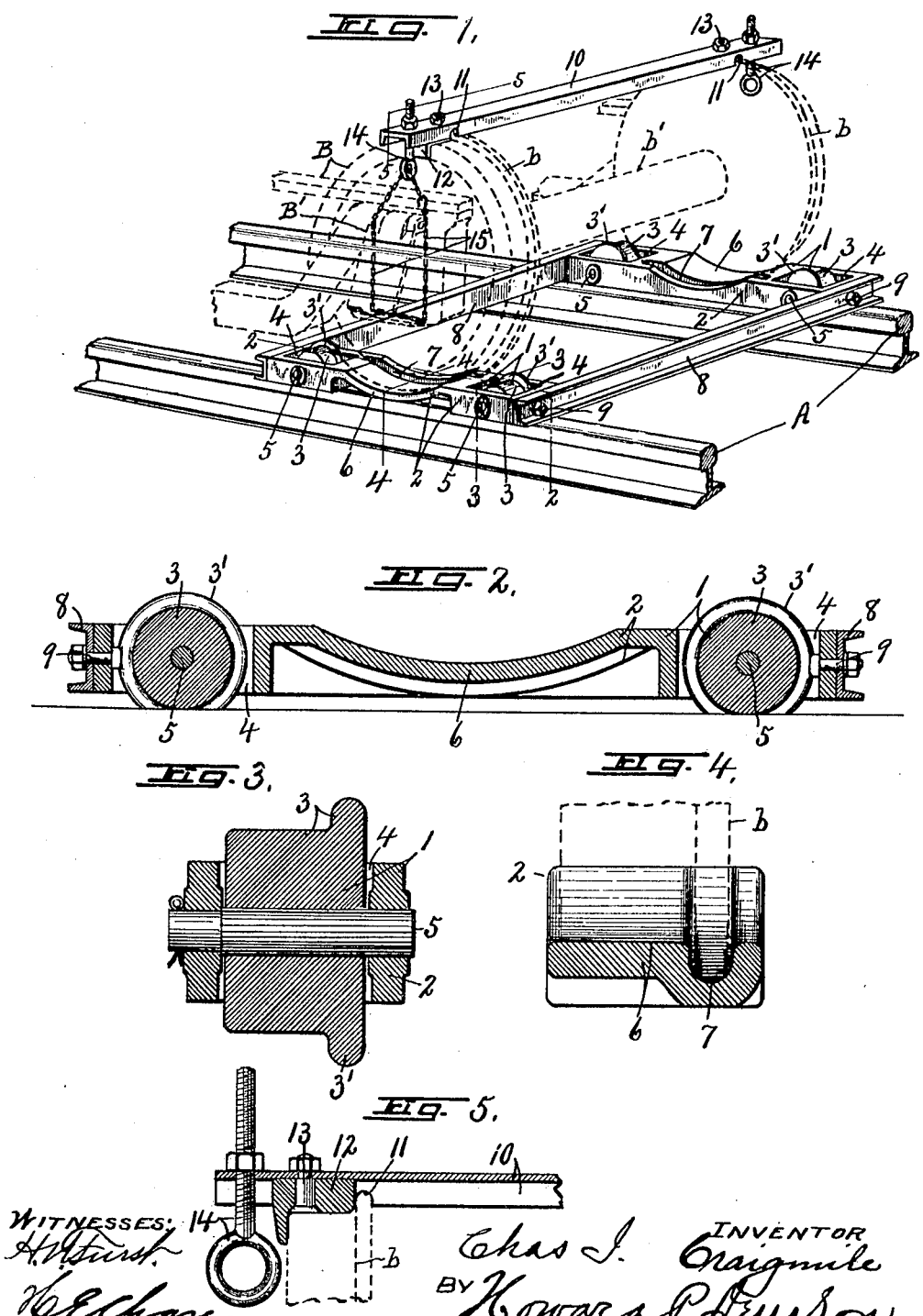

CHARLES I. CRAIGMILE, OF NORTH SYRACUSE, NEW YORK.

EMERGENCY-CARRIAGE FOR BROKEN RAILWAY-TRUCKS.

1,206,994.   Specification of Letters Patent.   Patented Dec. 5, 1916.

Application filed August 14, 1916. Serial No. 114,793.

*To all whom it may concern:*

Be it known that I, CHARLES I. CRAIGMILE, a citizen of the United States of America, and resident of North Syracuse, in the county of Onondaga, in the State of New York, have invented new and useful Improvements in Emergency-Carriages for Broken Railway-Trucks, of which the following, taken in connection with the accompanying drawings, is a full, clear, and exact description.

This invention relates to certain improvements in emergency carriages for broken railway trucks, and is particularly adapted for receiving and supporting the flanged wheels of broken car axles, the object being to provide simple, practical and efficient means for supporting the broken parts upon the rails and permitting the car to be propelled along the track to the car shop or other place where the broken parts may be repaired.

Other objects and uses relating to specific parts of the device will be brought out in the following description.

In the drawings—Figure 1 is a perspective view of a portion of a railway track and my improved emergency truck mounted thereon, the dotted lines representing the portion of the car truck with a broken axle as operatively mounted upon the emergency truck ready to convey the car to the place of repair. Fig. 2 is an enlarged longitudinal vertical sectional view through one side of the emergency truck taken on line 2—2, Fig. 1. Figs. 3 and 4 are still further enlarged transverse vertical sectional views taken, respectively, on lines 3—3 and 4—4, Fig. 1. Fig. 5 is an enlarged transverse vertical sectional view through one end of the upper frame-supporting bar taken on line 5—5, Fig. 1.

In order that my invention may be clearly understood, I have shown portions of the rails —A— of a railway track, and by dotted lines a portion of a car truck —B— having a pair of wheels —b— and a connecting axle —b'—, the ends of which are supported in suitable journal boxes —B'—, the axle —b'— being assumed to be broken in such manner as to derail the truck or car, or otherwise interfere with its safe transportation along the rails. Under these conditions, the car is brought to a stop and the impaired portion of the truck is then jacked up a sufficient distance to permit the placing of the emergency carriage in operative position upon the rails to receive and support the wheels —b—. For this purpose, the emergency carriage comprises a pair of relatively small pony trucks —1— spaced apart in parallelism opposite each other a distance corresponding to the distance from center to center of the rails —A—, each pony truck consisting of a frame —2— and a pair of flanged wheels —3— suitably journaled in opposite ends of the frame —2—, one in advance of the other a sufficient distance apart to permit the car wheel, as —b—, to rest on the intermediate portion of the frame —2— between the flanged wheels —3— without interfering with the free rolling movement of the wheels —3— along the rails —A—.

The flanged wheels —3— are of relatively small diameter and project a short distance below the under side of the corresponding truck frame —2— which is also of relatively short vertical height, preferably less than that of the diameter of the wheels —3—, so as to support the wheels —b— of the car truck as close to the upper surface of the rails —A— as possible when conveying the broken car along the track, and also permits the broken portion of the car to be more easily and quickly placed upon the emergency carriage.

Each truck frame —2— preferably consists of a single piece of cast or wrought metal of sufficient strength and durability to withstand the strains to which it is subjected, the opposite ends thereof being of rectangular box-like structure having vertical openings —4— therethrough for receiving the flanged wheels —3— which are carried by shafts or spindles —5— supported in the opposite walls of the openings —4—.

The periphery of each of the wheels —3— is of substantially the same cross sectional form and size as that of the car truck wheels —b— so as to ride freely upon the rails —A— and are, therefore, provided with annular flanges —3'— for guiding them in their rolling movement along said rails.

The intermediate portions of the frame —2— between the wheels —3— are arched downwardly at —6— to conform to the curvature of the periphery of the car wheel —b— which is adapted to rest thereon and may, therefore, be termed a supporting seat or saddle for the car wheel. The width of this saddle corresponds approximately to the width of the car wheel —b— and is provided in its upper face near its inner edge with a lengthwise groove —7— which is curved longitudinally for receiving the annular flange on the inner edge of the car wheel, the remaining portions of the upper face of the saddle —6— being substantially flat transversely to receive and support the corresponding portions of said car wheel.

The annular groove —7— of each pony truck —1— is alined longitudinally with the flanges —3'— of the wheels —3— so that when the car wheels —b— are supported on the pony trucks, the transversely flat, but longitudinally curved bearings, together with the longitudinally curved grooves —7— aid materially in holding the wheel on the broken axle in its normal upright position and in alinement with the rail along which it is adapted to travel.

In order that the pony trucks —1— of the emergency carriage may be held in fixed relation while transporting the car along the track, they are rigidly tied together at their ends by metal cross bars —8— which are secured to the end faces of the pony trucks —1— by bolts —9—, as shown more clearly in Fig. 2.

In some instances, it may be necessary or more convenient to place each truck in operative position for supporting the corresponding car wheel separately from the other, in which case it would be simply necessary to remove the cross bars —8— by simply removing the bolts of the nuts —9— and withdrawing said bars which could afterward be quickly replaced in operative position when the car wheels are properly supported upon their respective trucks —1—, whereupon the car with the broken axle having its wheels resting upon the pony trucks of the emergency carriage could be easily and quickly drawn to the place of repair.

Suitable means is provided for engaging the upper portions of the car wheels to additionally hold them in an upright position when resting upon the pony trucks of the emergency carriage and also for supporting either end of the truck frame in case the fracture of the axle should be such as to allow the adjacent portions of the car truck to drop down upon the ties, and for this purpose I have provided an additional cross bar —10— of sufficient length to rest upon the upper edges of both of the car wheels —b— and to extend some distance beyond the outer faces thereof, said bar being provided with transverse grooves —11— for receiving the flanges of the car wheels —b—, and also provided with flanged blocks —12— for engaging the periphery and outer end face of the upper portions of said car wheels, as shown more clearly in Fig. 5, the blocks being secured to the cross bar —10— by bolts —13—.

The means for supporting the adjacent ends of the car truck frame comprises a pair of eye-bolts —14— suitably secured to opposite ends of the bar —10— just at the outside of the outer end faces of the car wheels —b— with their eyes extending downwardly from the under side of the cross bar for receiving and supporting a chain or cable —15— which is adapted to be passed around the under side of the journal box —B'— or other portion of the frame of the car truck, each cable and its eye-bolt being both adjustable to support the frame of the car truck at the normal or desired height above the emergency carriage.

The operation of my invention may now be readily understood upon reference to the foregoing description and accompanying drawing, and it is evident that certain changes may be made in the detail of construction of the various parts without departing from the spirit of my invention.

What I claim is:

1. In a device of the character described, a "pony truck" having tandem wheels flanged to guide them upon a rail, said truck having a concave seat between the wheels for receiving and supporting a car wheel edgewise vertically clear of such rail.

2. In a device of the character described, a "pony truck" having tandem wheels and an intermediate saddle in line with the wheels for receiving and supporting a car wheel edgewise vertically.

3. In a device of the character described, a "pony truck" having tandem wheels and a frame connecting said wheels and holding them with their axes in parallelism, said frame having a longitudinally concave seat provided with a lengthwise groove for receiving and supporting the rim and flange of a railway car wheel.

4. In a device of the character described, a "pony truck" comprising a frame and tandem wheels journaled thereon some distance apart and flanged to guide them along one of the rails of a railway track, the portion of the frame between the wheels being provided with a longitudinally concave seat and a lengthwise groove therein alined with the flanges of said wheels for receiving and supporting the rim and flange of a railway car wheel.

5. In a device of the character described, a pair of "pony trucks" in spaced relation corresponding to the spacing of the rails of a railway track and each provided with tandem wheels for rolling contact with said rails and spaced some distance apart longitudinally, the intermediate portions of the trucks being provided with saddles longitudinally alined with the corresponding wheels for receiving and supporting a pair of railway car wheels edgewise vertically, and connections between the "pony trucks" for holding them in fixed relation.

6. In a device of the character described, a pair of "pony trucks" in spaced relation corresponding to the spacing of the rails of a railway track, and each provided with tandem wheels for rolling contact with said wheels and spaced some distance apart longitudinally, the intermediate portions of the trucks being provided with saddles longitudinally alined with the corresponding wheels for receiving and supporting a pair of railway car wheels edgewise vertically, and rigid cross bars connecting opposite ends of the "pony trucks" for holding them in fixed relation.

7. In a device of the character described, the combination of a "pony truck" having tandem wheels spaced some distance apart to ride upon a rail, said truck having a saddle intermediate the wheels for supporting the railway car wheels edgewise vertically, a superposed bar for engaging the top of such railway car wheel, and means on the bar for supporting a part of the frame of a railway car truck adjacent the car wheel.

8. In a device of the character described, the combination of a pair of "pony trucks" in spaced relation corresponding to the spacing of the rails of a railway track, and each provided with tandem wheels also spaced some distance apart lengthwise of the rail and having its portion intermediate the wheels provided with a supporting saddle for the car wheel of a railway truck, rigid connections between the "pony trucks" to hold them in fixed relation, a superposed bar having means for interlocking engagement with the flanges at the upper sides of the car wheels, and separate devices on said bar for supporting adjacent portions of the frame of a railway car truck.

In witness whereof I have hereunto set my hand this 10th day of August 1916.

CHARLES I. CRAIGMILE.

Witnesses:
  E. A. THOMPSON,
  HOWARD P. DENISON.

Copies of this patent may be obtained for five cents each, by addressing the "Commissioner of Patents, Washington, D C."